United States Patent [19]

Miles

[11] Patent Number: 5,623,855
[45] Date of Patent: Apr. 29, 1997

[54] MOTORCYCLE PARKING STAND

[75] Inventor: Vernon H. Miles, Fort Walton Beach, Fla.

[73] Assignee: Power Park, Inc., Fort Walton Beach, Fla.

[21] Appl. No.: 312,096

[22] Filed: Sep. 26, 1994

Related U.S. Application Data

[63] Continuation-in-part of Ser. No. 85,418, Jun. 30, 1993, abandoned.

[51] Int. Cl.⁶ ........................................ G05G 1/18
[52] U.S. Cl. .................... 74/564; 280/293; 280/300; 280/303
[58] Field of Search ........................ 74/564, 594.7; 280/291, 293, 294, 300–303

[56] References Cited

U.S. PATENT DOCUMENTS

| 689,451 | 12/1901 | Barry | 280/300 |
|---|---|---|---|
| 2,171,042 | 8/1939 | Minton | 280/293 |
| 2,285,313 | 6/1942 | Tagliaboschi | 280/303 |
| 2,289,661 | 7/1942 | Lewis | 280/293 |
| 3,918,743 | 11/1975 | Sato et al. | 280/293 |
| 4,119,327 | 10/1978 | Emerson | 280/293 |
| 4,203,500 | 5/1980 | Kamiya | 280/293 X |
| 4,377,295 | 3/1983 | Lemman | 280/303 |
| 4,420,164 | 12/1983 | Mitchell | 280/293 |
| 4,445,705 | 5/1984 | Hayashi et al. | 280/302 |
| 4,582,336 | 4/1986 | Onoda | 280/293 |
| 4,773,665 | 9/1988 | Hindle | 280/293 |
| 4,976,452 | 12/1990 | Fujita | 280/293 |
| 5,234,225 | 8/1993 | Yaple | 280/293 |
| 5,388,848 | 2/1995 | Silva et al. | 280/300 |

FOREIGN PATENT DOCUMENTS

| 696379 | 9/1940 | Germany | 280/293 |
|---|---|---|---|
| 3727725 | 8/1987 | Germany | 280/293 |
| 240385 | 9/1989 | Japan | 280/293 |
| 303089 | 10/1992 | Japan | 280/293 |

*Primary Examiner*—Vinh T. Luong
*Attorney, Agent, or Firm*—Harness, Dickey & Pierce, P.L.C.

[57] ABSTRACT

A center parking stand for a motorcycle which balances the motorcycle without substantially bearing the weight of the motorcycle. The stand includes a mounting portion which mounts the stand to the motorcycle and allows the stand to rotate between stowed and use positions. A pair of support legs extend away from the mounting portion and terminate in support surfaces adapted to engage a parking surface. The legs have a length which enables the stand to be moved from its stowed position to its use position such that the rear wheel of the motorcycle remains engaged with the parking surface during the entire parking procedure and while the motorcycle is parked. The legs cooperate with one another and take over, from the rider, the function of balancing the motorcycle in its substantially vertical, non-leaning, position while the wheels of the motorcycle remain responsible for carrying the weight of the motorcycle. The stand additionally incorporates features that function to prevent the motorcycle from falling over in the event the stand penetrates into the parking surface. These features cooperate to bias the motorcycle to the left and support the motorcycle in a leaning position.

2 Claims, 4 Drawing Sheets

MOTORCYCLE PARKING STAND

CROSS REFERENCE TO RELATED APPLICATION

This application is a continuation-in-part application of U.S. patent application Ser. No. 08/085,418, filed Jun. 30, 1993, and entitled Motorcycle Parking Stand now abandoned.

BACKGROUND OF THE INVENTION

1. Field of the Invention

This invention generally relates to a motorcycle parking stand and, more particularly, to a center parking stand for use on large, heavyweight touring/cruiser class motorcycles.

2. Description of the Prior Art

Large, heavyweight touring class motorcycles typically weigh between 1200 and 1300 lbs including the rider, passenger and luggage. These motorcycles are easily controlled by the skilled rider as long as there is a sufficient forward motion which will allow for unbalanced dynamic forces to be corrected. When the motorcycle is stopped, these dynamic forces give way to destabilizing static forces that require the rider to keep the motorcycle balanced in a vertical position using the rider's feet, legs, body motion or weight. Any unbalanced static force can turn precipitously into an uncontrollable dynamic force if an excessive lean angle develops during stopping or the parking process. The result is that the rider might be required to "lay down" the motorcycle risking, not only personal injury, but also damage to the motorcycle.

Typically, these large touring motorcycles, and sometimes smaller motorcycles too, are equipped with dual parking stands. One of these stands is a side stand which requires the rider to lean the burdened motorcycle to the left until the side stand contacts the parking surface and assists in supporting the motorcycle. In this leaned and awkward position, the rider and/or passenger then dismounts. Often the unbalanced forces being exerted on the suspension system and the stand cause the motorcycle to move and shift during the dismounting process. The second type of parking stand is known as a main or center stand. Use of the center stand first requires use of the side stand as described above to permit the rider to dismount the motorcycle. The dismounted rider then uprights the motorcycle off of the side stand and balances the motorcycle in the vertical position while standing beside it. While holding the motorcycle upright and standing beside it, the rider then, with one foot, lowers the main stand to the parking surface. A combination of forces cause the motorcycle to be raised upward and moved backward onto the center stand and into its parked position. These forces include exerting a standing pressure with one foot, typically the right foot, on a footlever of the center stand, maintaining the balance of the motorcycle with the left foot and left hand, and applying a lifting force with the right hand. As a result, the rear wheel of the motorcycle becomes elevated and remains suspended above the parking surface when the motorcycle is brought up on the main stand.

FIG. 1 illustrates a motorcycle 10 of the touring or cruiser variety. In the figure, the motorcycle 10 is parked on a side stand 12 of a known variety. To park the motorcycle 10, the motorcycle 10 is leaned to the left until the downwardly extended side stand 12 contacts the parking surface 14 and supports the motorcycle's unbalanced weight. The rider and/or passenger then dismount from this parked position. Later, the rider remounts, lifts the motorcycle 10 off the side stand 12 into an upright, balanced position and applies forward power to ride away.

FIG. 2 shows the touring motorcycle 10 parked on a main stand 16 of a known variety. In order to park the motorcycle 10 on the main stand 16, the rider first parks the motorcycle on its side stand 12 as discussed below. The rider then dismounts and stands alongside the motorcycle 10. The motorcycle 10 is then lifted off of the side stand 12 and simultaneously, while standing on one foot, typically the left foot, the rider balances the motorcycle 10 on its two wheels 20 and 22 by holding the handlebar 24 with one hand, the left hand. The rider places the other foot, the right foot, on a footlever 18, lowers the main stand 16 down to the parking surface, and lifts and pulls the rear of the motorcycle 10 upward and backward on a lifting handle 26 with the other hand, the right hand. The resulting timing and combination of forces raise the motorcycle 10 upward and rearward until it is resting on the main stand 16 with the rear wheel 22 of the motorcycle 10 suspended above the parking surface 14.

The above procedure is essentially reversed in order to ready and mount the motorcycle for riding. First, the rider stands alongside the motorcycle 10 with his left hand on handlebar 24 and his right hand on the lifting handle 26. Then, by pulling on the lifting handle 26, the motorcycle 10 is simultaneously lifted upward and pulled forward until it is off main stand 16. The side stand 12 is then lowered and the motorcycle 10 leaned onto the side stand 12 and into the parked configuration shown in FIG. 1. The motorcycle 10 can then be mounted by the rider and passenger, balanced by the rider in its upright configuration, the side stand 12 retracted into its stow position, and the motorcycle 10 ridden away using forward power.

Parking the motorcycle on the main stand is more desirable than using the side stand because of the greater stability it offers. However, most riders avoid this procedure because it is very strenuous and hazardous and since the rider may easily lose control of and drop the motorcycle during parking.

As seen from the above discussion, the parking stands presently in use and their methods of operation suffer from a number of inherent limitations. First, the side stand requires the rider to lean the stationary motorcycle from a balanced vertical position to an unbalanced leaning position. Additionally, both rider and passenger are required to dismount the motorcycle before it can be parked on the main stand. Parking the motorcycle on the main stand is strenuous and is a complex, coordinated procedure which requires the rider to lift the motorcycle from the side stand parking position, balance it while standing on one foot, raise the other foot to lower the main stand, and lift the motorcycle with the other hand while simultaneously applying a standing force on a footlever of the main stand. When the main stand finally reaches the park position, the rear wheel of the motorcycle is suspended above the parking surface.

As mentioned above, although parking on the main stand is the more secure of the two parking positions, most riders avoid this because of the combination of physical strength and coordination required to perform the procedure. When the main stand is being used, so much weight is exerted on the parking surface because of the raised rear end of the motorcycle that, if the surface is not sufficiently hard, the stand will penetrate into the parking surface. This often causes the motorcycle to fall over onto the ground damaging the motorcycle and potentially injuring any by-standers. This problem is more common when parking on blacktop surfaces where the sun heats the surface over the course of the day.

The ride away procedure from this type of main stand is essentially the reverse of the parking procedure. The rider stands alongside the motorcycle, lifts up and pulls forward on the motorcycle until it comes off the main stand, stops the forward motion while keeping the motorcycle balanced, lowers the motorcycle to the side stand parking position, and then mounts the motorcycle. The passenger can either mount the motorcycle while it is on its side stand or wait until it is balanced by the rider in the vertical position. After the motorcycle has been balanced upright, the rider raises the side stand with the left foot, shifts the motorcycle to gear and rides away. As with parking the motorcycle, removing it from the main parking stand can also be hazardous since it too requires a certain amount of strength and timed coordination.

With the limitations of the prior art in mind, it is an object of the present invention to provide a center or main parking stand which does not require use of the side stand during the parking procedure. Instead, during parking on the center stand the motorcycle is always kept in a balanced upright configuration or orientation.

Another object of this invention is to provide a center parking stand which allows the rider remains on the motorcycle during the entire parking procedure and ride away procedure.

Yet another object of this invention is to provide a center parking stand which can replace the stock main stand provided with the motorcycle by the manufacturer.

Still another object of this invention is to provide a center parking stand which balances the motorcycle while parked but does not bear or support a significant amount of the motorcycle's weight.

A further object is to provide a center parking stand which reduces the likelihood that it will penetrate into the parking surface.

A still further object is to provide a center stand which converts, at least partially, into a side stand type of parking stand in the event of the stand penetrating into the parking surface.

SUMMARY OF THE INVENTION

In achieving the above objects and advantages, it will be seen that the present invention is a center parking stand which allows an onboard rider to perform all the parking and ride away functions from a balanced, substantially vertical configuration while mounted on the motorcycle. During use of the present invention, the rider brings the motorcycle to a stop, lowers the parking stand of the present invention to the parking surface and then backs the motorcycle onto the parking stand using the motorcycle's reverse power or a slight pulling force on the motorcycle's handlebars. At all times, the motorcycle remains in its stable vertical configuration while both wheels, the parking stand and the riders feet remain on the parking surface. The rider may then dismount and leave the motorcycle parked in this upright, balanced condition. When the rider is again ready to use the motorcycle, the rider simply remounts the parked motorcycle and rides away in the upright configuration using the motorcycle's forward power. The parking stand of this invention is automatically retracted into its stowed position.

Since the motorcycle remains in a substantially balanced and stable upright or vertical configuration at all times, unbalanced forces are minimized and easily controlled by the rider. This is achieved because the rider is onboard during the entire parking procedure and located in the riding position, the best position to balance, control and access the motorcycle's controls and power source. As a result, the parking stand of this invention requires a minimum amount of manual or physical effort during its use.

During use, the parking stand of the present invention exerts minimal forces on the parking surface because the primary weight of the motorcycle is always supported by the wheels of the motorcycle. The stand only exerts enough force to keep the motorcycle in an upright balanced configuration. As will be seen from the more detailed discussion which follows, the parking stand of this invention emulates the rider's balancing efforts and utilizes the experienced rider's management skills, rather than strenuous manual efforts, to routinely balance, park and ride away on the motorcycle. In essence, the present invention operates as a mechanical substitute for the rider's ability to balance the motorcycle. The weight of the motorcycle is carried by the motorcycle itself. While parking, or during the ride away procedure, the balancing function is transferred back and forth between the rider and the present invention as required.

The stand also has a graceful degradation of performance incorporated in its design. While a rider should not park on a "soft" surface, or any surface into which the stand might penetrate, this will inevitably and unfortunately happen. To anticipate and compensate for this undesirable situation, the parking stand of this invention has a larger footprint on its right support shoe than on its left. This causes the left support shoe to penetrate into the parking surface first, leaning the motorcycle to the left. As a result, a footlever on the left leg of the parking stand is further lowered to the parking surface and provides additional support similar to a side stand. A tab on the end of the footlever further limits the lean angle of the motorcycle to a near upright configuration so that practically all of the motorcycle's weight remains on the wheels in this slightly degraded, but safe and stable configuration.

The ride away procedure is also greatly simplified. The rider boards the stable, parked motorcycle, starts the motorcycle, applies forward power and rides away in a balanced vertical orientation. The present parking stand is spring biased, like many prior main stands, so that it will automatically retract and remain in its stowed position, ready for its next use, as the motorcycle moves forward.

Additional benefits and advantage of the present invention will become apparent to those skilled in the art to which this invention relates from the subsequent description of the preferred embodiments and the appended claims, taken in conjunction with the accompanying drawings.

DETAILED DESCRIPTION OF THE PREFERRED EMBODIMENT

Figure 3:
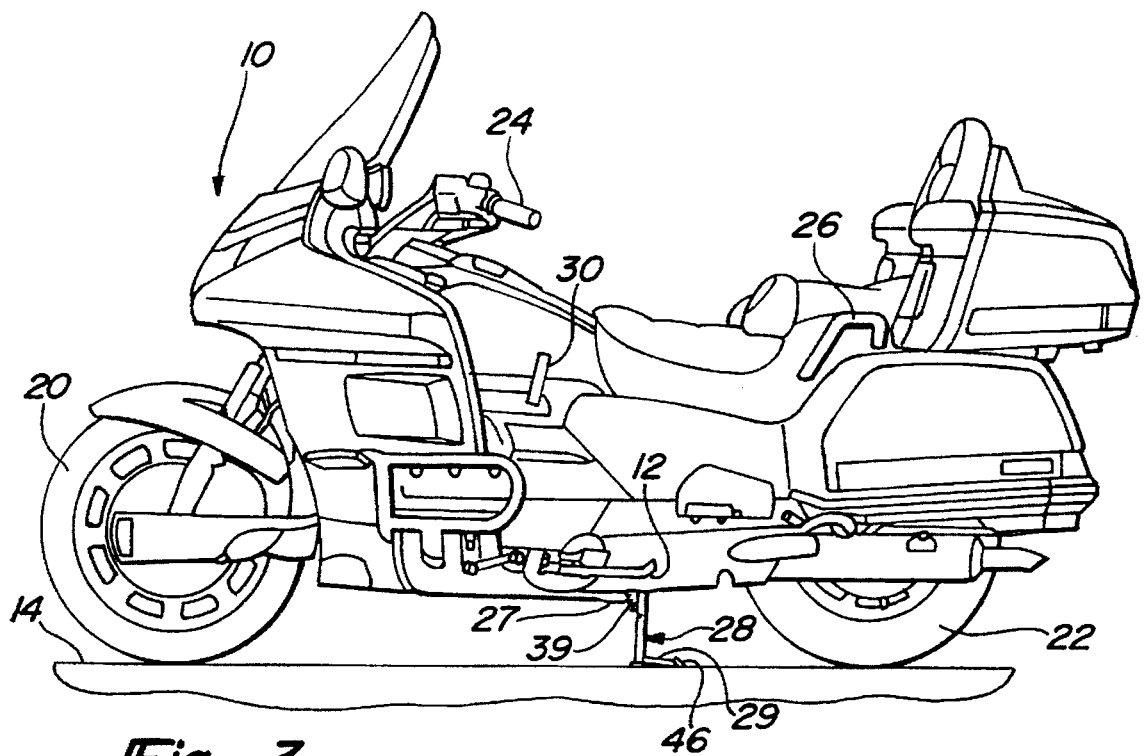
FIG. 3 shows the motorcycle parked on a parking stand embodying the principles of the present invention so that the parking stand performs the necessary balancing functions while the wheels support the weight of the motorcycle.

Referring now to the drawing, FIG. 3 generally shows the motorcycle 10 parked on a center or "balancing" parking stand 28 incorporating the principles of the present invention. When using the center parking stand 28 of this invention, the rider stops the motorcycle 10 in its upright balanced position and with both the rider and passenger remaining thereon, the reverse gear is selected with a gear lever 30. While remaining seated and balancing the motorcycle 10 on one foot, usually the right foot, the rider uses the other (left) foot to engage a footlever 29 and lower the parking stand 28 down to the parking surface 14. While in reverse, the motorcycle 10 is driven rearward under its own power onto the parking stand 28 which then provides a stable parking/mounting/dismounting platform. The motorcycle 10 is kept in reverse gear to lock or constrain the back wheel 22 and forward movement, similar to a parking brake found on automobiles. The rider and passenger can then dismount from this stable, upright parking platform and leave the motorcycle 10 parked in its upright or generally vertical configuration.

As with the parking process, the present invention greatly simplifies the ride away procedure over the prior art. The rider and passenger simply remount the parked motorcycle 10 while it is in its upright position and on the parking stand 28, shift the reverse gear lever 30 to normal or forward and apply forward power to ride away in a stable vertical position. During the ride away procedure, the parking stand 28 retracts into its stowed position ready for its next use.

The description that follows, as well as the remaining figures, further detail the present invention and expand the description of its operation.

Figure 4:
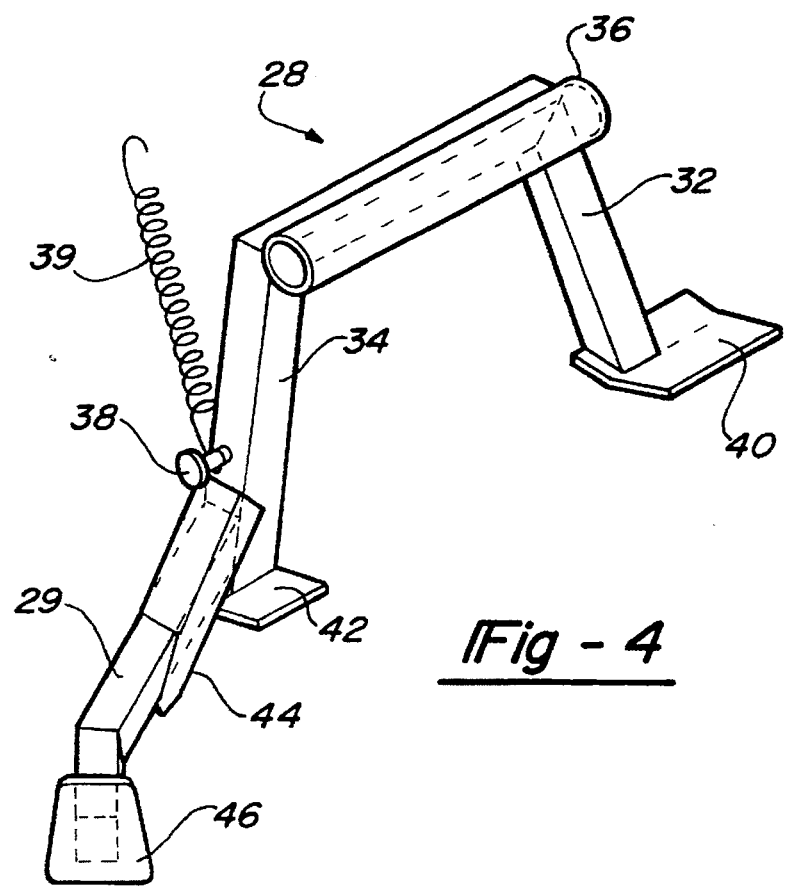
FIG. 4 is a perspective view of the parking stand of the present invention isolated from a motorcycle.

FIG. 4 shows the parking stand 28 removed from the motorcycle 10. The stand 28 is a weldment which includes a right leg 32 and a left leg 34 which are generally interconnected by a cylindrical axle housing 36 that is configured to receive an existing axle (not shown) of the motorcycle 10 thereby mounting the parking stand 28 to the frame 27 of the motorcycle 10. A spring pin 38 extends from the left leg 34 and provides a point for attachment of a retraction spring 39 which may be part of the motorcycle's original equipment. Using the axle and housing 36 as a pivot axis, the spring 39, whose other end is attached to the frame 27 or other portion of the motorcycle 10, can be moved over center to alternatingly maintain the stand 28 in either its down, parked or use position or its up or stowed position.

Figure 1:
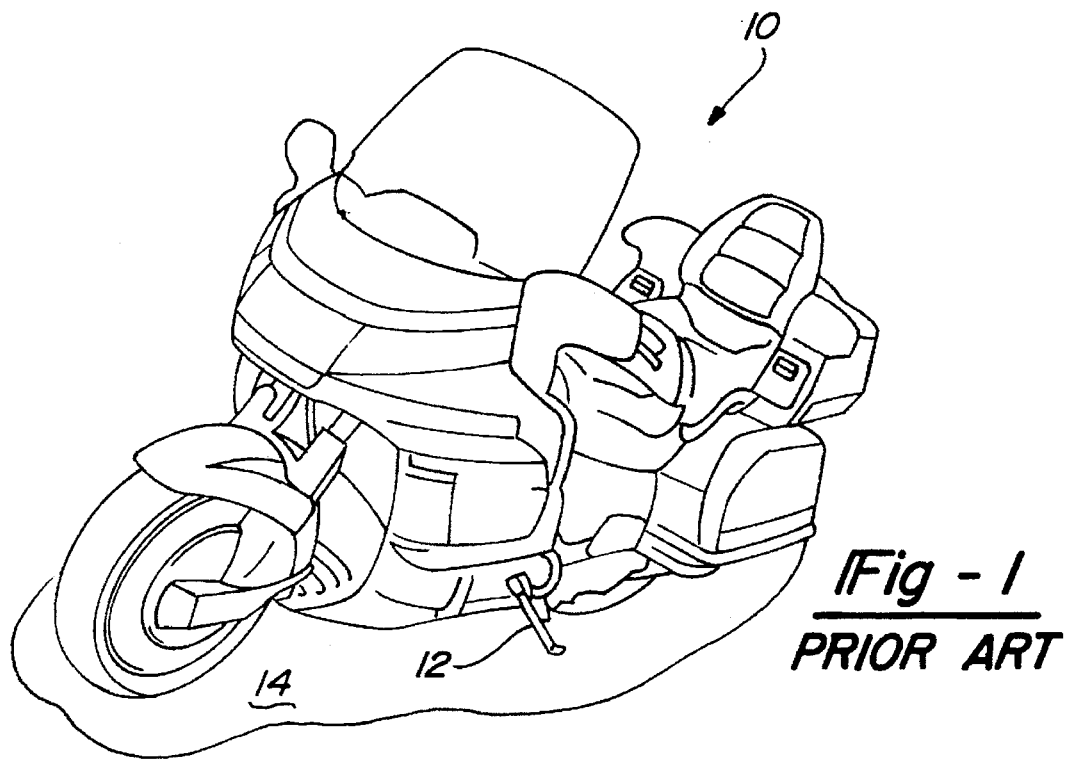
FIG. 1 shows a motorcycle parked on a typical side parking stand with the resulting lean angle being particularly evident.
Figure 2:
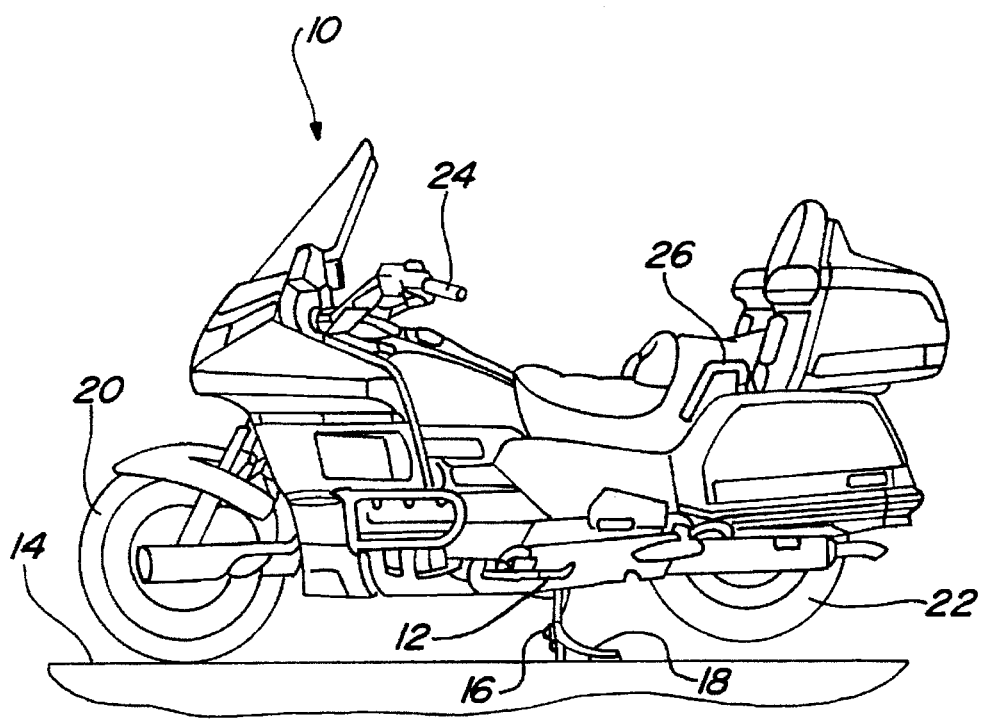
FIG. 2 shows a motorcycle parked on a typical main stand with the rear wheel suspended above the parking surface.

The right and left legs 32 and 34 are the primary support and balance members of the stand 28. The legs 32 and 34 are respectively provided with a right support shoe or foot 40 and a left support shoe or foot 42 both of which include surfaces which will contact the parking surface 14 to balance the destabilizing forces and provide vertical stability to the motorcycle 10. As seen in FIG. 4, the right shoe 40 extends away from the left leg 34 and has a longer or larger footprint and surface area. This operates to widen the stance of the stand 28 and increase its lateral stability. In the event the motorcycle 10 is parked on a parking surface 14 into which the stand 28 might penetrate, the smaller left shoe 42 will sink into the parking surface 14 first, because of the larger footprint of the right shoe 40, biasing or causing the motorcycle 10 to lean to the left. The motorcycle 10 is prevented from tipping over as a result of the footlever 29, extending from the left leg 42, being lowered into contact with parking surface 14. The increased surface area of the footlever 29, which includes a balance tab 46 on its distal end, distributes the unbalanced weight of the motorcycle 10 over an increased support area of the parking surface 14 resulting in the unbalanced weight being supported similar to the side stand 12 seen in FIG. 1.

A normal or hard parking surface 14 such as concrete supports the motorcycle 10 in a substantially vertical position while the support shoes 40 and 42 provide virtually equal balancing forces to maintain the motorcycle 10 upright. Support bracket 44 provides added strength to the footlever 29 and the balance tab 46, which normally contacts the parking surface 14, widens the stance of the stand 28 providing additional lateral stability to the motorcycle 10 while parked and while the rider is mounting or dismounting. While the primary function of footlever 29 is to lower the parking stand 28 to the parking surface 14, a secondary function, as seen above, is to support the motorcycle and limit leaning of the motorcycle 10 during the unbalanced situation created when the motorcycle 10 is parked on a parking surface 14 into which the parking stand 28 has penetrated.

As seen from the above discussion, a principal feature of the present parking stand 28 is that it keeps the motorcycle 10 in a generally vertical or upright configuration while parked on a normal hard parking surface 14. Considerations have also been taken into account to permit parking on softer, less than ideal surfaces. On these surfaces, the design of the parking stand 28 is such that it purposely biases the lean angle of the motorcycle 10 to the left, where the unbalanced forces can be accommodated and supported by the footlever 29, and balancing tab 46 and associated structures. Parking on surfaces offering marginal support will be avoided by the skilled rider in all but the most adverse/ emergency conditions.

Referring now to FIGS. 5–8, use of the present invention will be described during both the parking and ride away procedures.

Figure 5:
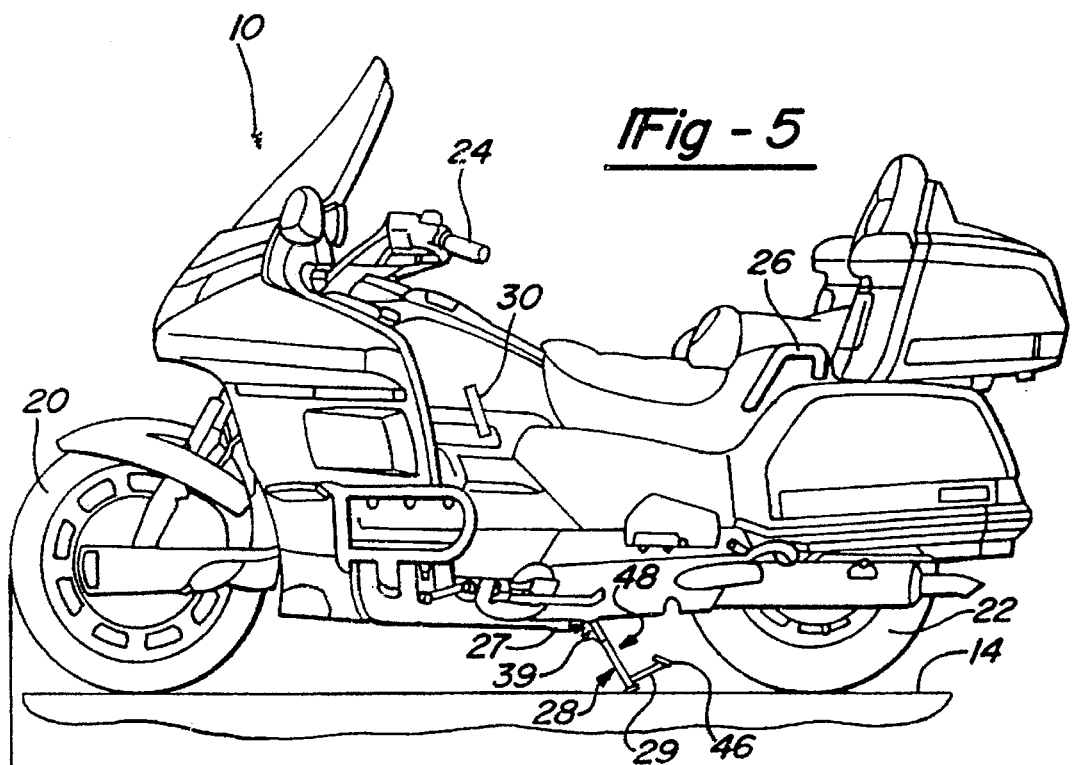
FIG. 5 shows the center parking stand of the present invention lowered to the parking surface and ready for parking of the motorcycle.
Figure 6:
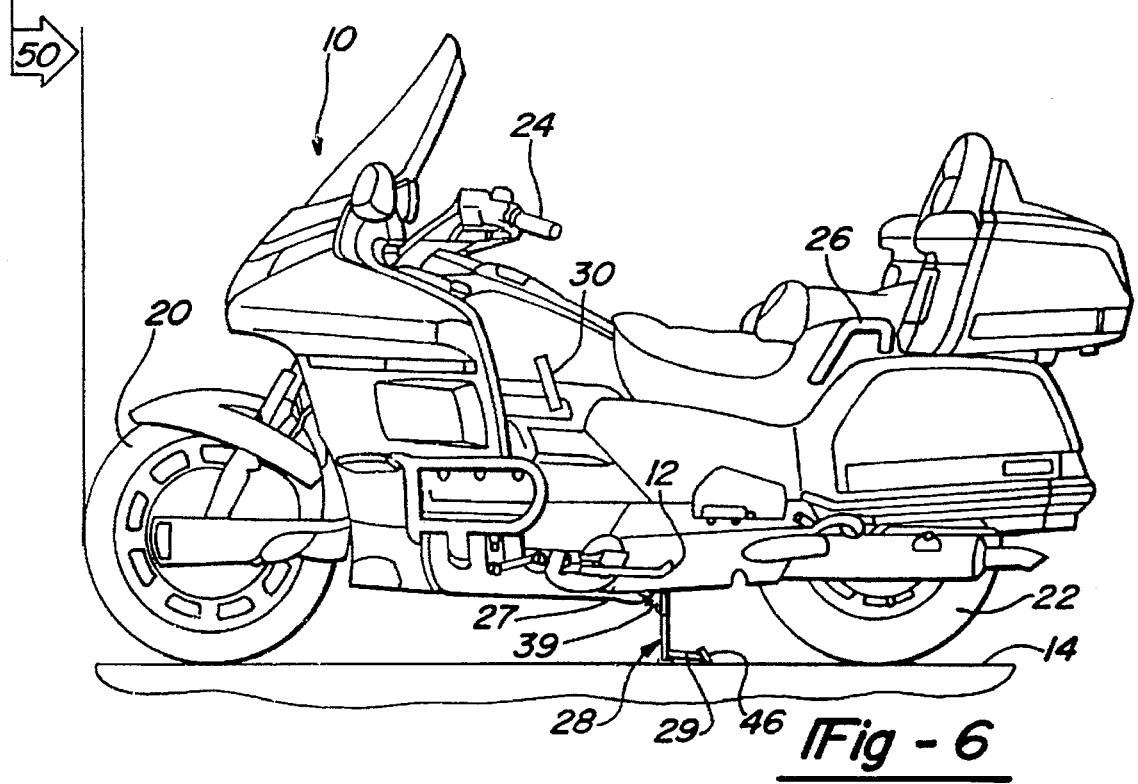
FIG. 6 shows the present center parking stand with the motorcycle parked.

FIG. 5 shows the motorcycle 10 in the ready to park configuration where the onboard rider (who has been omitted from the figures for clarity) has stopped and shifted the reverse gear lever 30 to its reverse position; has initially lowered the parking stand 28 to the parking surface 14 by stepping downward on footlever 29 (see motion arrow 48); and has begun to apply reverse power, generally designated by the arrow at 50, to back the motorcycle 10 into the parked configuration seen in FIG. 6. At all times during parking, both wheels 20 and 22, and especially the rear wheel 22, remain in contact with the parking surface 14 and support the weight of the motorcycle 10. Thus, the length of the legs 32 and 34 are such that they will not cause or require the rear wheel 22 to be raised off of the parking surface 14 either during the parking procedure, while parked or during the ride away procedure. The length of the legs 32 and 34 is also such that they will not cause the parking stand 28 to bear the weight of the motorcycle 10. Rather, the motorcycle's weight remains supported by the wheels 20 and 22 while the parking stand 28 functions to balance the motorcycle 10 in a substantially vertical position. This feature also helps to inhibit and prevent the parking stand 28 from penetrating into the parking surface 14 thereby eliminating all of the above mentioned problems associated with that situation.

During parking, the function of actually balancing the motorcycle 10 is transferred from the rider to the parking stand 28. The rider and passenger may then dismount the upright and vertically stable motorcycle 10 and leave it parked with the reverse gear acting as a parking brake.

Figure 7:
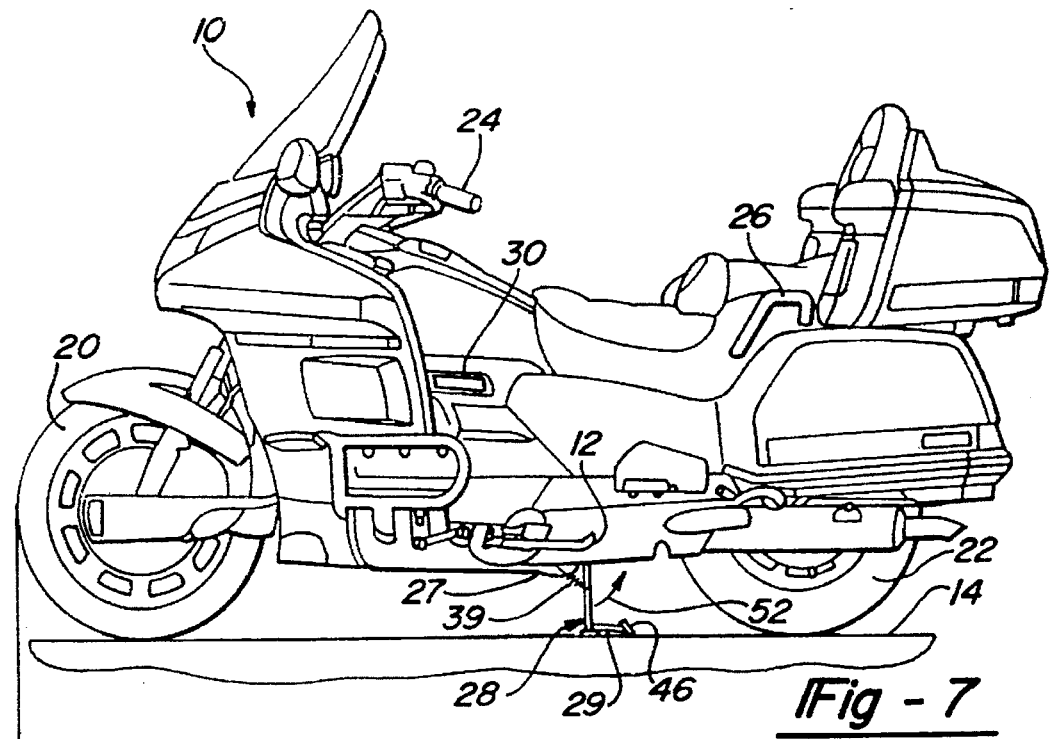
FIG. 7 shows the motorcycle parked on the center parking stand of this invention and ready for the ride away procedure.
Figure 8:
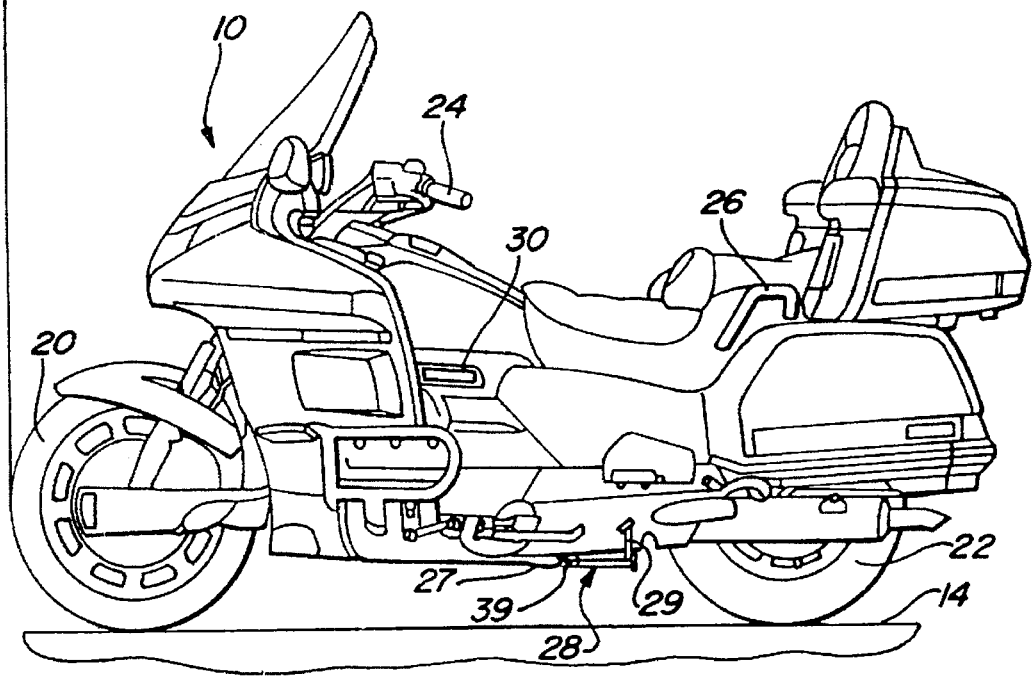
FIG. 8 shows the motorcycle off the parking stand of this invention and during the ride away procedure.

FIG. 7 shows the motorcycle 10 at the beginning of the ride away procedure. In FIGS. 7 and 8, the rider has mounted the parked motorcycle 10 and the rider has shifted the reverse gear lever 30 to its normal, forward operating position. When forward power is applied, the motorcycle 10 is driven off of the parking stand 28 as the stand 28 rotates into its stowed position (as indicted by motion arrow 52), as seen in FIG. 8, where it is alternatingly maintained by the spring 39 ready for its next use. When the motorcycle is rolling forward during the ride away procedure, the function of balancing the motorcycle 10 is transferred from the parking stand 28 back to the rider.

During both the parking and ride away procedures, the motorcycle 10 is, at all times, kept in a substantially vertical and easily controllable orientation. Thus, balance efforts are held to a minimum. Also, both the reverse and forward power required by the procedures can be provided by the motorcycle 10 and, the entire procedure from stop to park lasts only approximately four seconds. Similarly, the ride away procedure takes only about two seconds after rider and passenger have mounted the motorcycle 10 and are ready to ride.

As seen from the above, one of the most important functions a rider performs is controlling the motorcycle's 10 balance at all times. The parking stand 28 of this invention not only provides a stable parking platform for the modern touring motorcycle 10, but it also harnesses the rider's acquired skills of balance and control through use of the available onboard power systems to park the motorcycle 10.

The present invention allows the rider to stop, use the motorcycle's power to park in a stable upright configuration and then assumes the balancing function while the motorcycle 10 is parked. It also allows the rider and passenger to dismount from a stable upright platform and leave the motorcycle 10 safely unattended until its next use. The invention still further allows the rider and passenger to mount the motorcycle 10 while in a stable upright orientation and safely ride away. As a result, the invention reduces the park and ride away functions to an efficient, safe and virtually effortless procedure.

Perhaps the most rewarding element provided by the present invention is that it expands the rider's management skills to enhance the safety of the rider, the passenger and the motorcycle by reducing the hazards associated with old parking methods. Confidence in a simple system that works reliably is an extremely important factor to a rider, especially in the safe management of motorcycle handling.

While the above description constitutes the preferred embodiments of the present invention, it will be appreciated that the invention is susceptible to modification, variation and change without departing from the proper scope and fair meaning of the accompanying claims.

What is claimed is:

1. A motorcycle adapted to be parked on a parking surface located beneath said motorcycle, said motorcycle comprising:

an engine;

a front wheel;

a rear wheel;

a frame, said frame supporting said engine, said front wheel, and said rear wheel;

a center parking stand including mounting means for mounting said parking stand to said frame for movement about an axis and between a stowed position and a use position in which said parking stand extends downward from said frame, said use position being employed to park said motorcycle;

biasing means for alternatingly biasing and maintaining said parking stand in said stowed and use positions;

said parking stand further including a right support leg terminating in a right support shoe and a left support leg terminating in a left support foot shoe, said right support shoe extending in a direction away from said left support leg thereby widening a stance of said parking stand and increasing stability of said parking stand in said use position, said support shoes defining right and left support surfaces adapted to engage the parking surface, said right support surface having a larger surface area than said left support surface and being adapted to lean said motorcycle to the left in the event of at least one of said legs penetrating into the parking surface;

lean limiting means for limiting the amount of lean imparted to said motorcycle, said lean limiting means including a portion defining a footlever extending outward from said left support leg, said footlever having a footlever length and being oriented such that said footlever contacts the parking surface when said parking stand is in said use position, said support legs being secured to said mounting means for rotation about said axis, said right and left support legs extending away from said mounting means and exhibiting a leg length enabling said parking stand to be moved from said stowed position to said use position, said length of said legs being such that said rear wheel of said motorcycle engages the parking surface when said motorcycle is parked on said parking stand, said leg lengths permitting said legs to cooperate with each other to balance said motorcycle in a vertical position when said parking stand is in said use position without causing said legs to bear the weight of said motorcycle, the weight of said motorcycle being supported by said front and rear wheels of said motorcycle when said motorcycle is parked.

2. A motorcycle as set forth in claim 1 wherein said footlever operates to widen the stance of said parking stand thereby increasing the stability of said parking stand in said use position.

* * * * *